(12) United States Patent
Williams et al.

(10) Patent No.: US 8,967,134 B1
(45) Date of Patent: Mar. 3, 2015

(54) LIQUID FUEL FIRED TILTING SKILLET SYSTEM

(75) Inventors: Ben Williams, Norwood, MA (US); Jude J. Jordan, Providence, RI (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 1064 days.

(21) Appl. No.: 13/021,187

(22) Filed: Feb. 4, 2011

Related U.S. Application Data

(60) Provisional application No. 61/387,103, filed on Sep. 28, 2010.

(51) Int. Cl.
*F24C 5/00* (2006.01)
*F24C 5/12* (2006.01)
*A47J 37/12* (2006.01)

(52) U.S. Cl.
CPC ............... *F24C 5/12* (2013.01); *A47J 37/1242* (2013.01)
USPC ................. 126/50; 126/49; 99/407; 99/409; 99/424

(58) Field of Classification Search
CPC .......... F24C 5/00; F24C 5/20; A47J 37/1261; A47J 37/12
USPC ........................ 126/50; 99/407, 409
See application file for complete search history.

(56) References Cited

U.S. PATENT DOCUMENTS

| | | | | |
|---|---|---|---|---|
| 3,837,329 | A | * | 9/1974 | Mutchler ........................ 126/44 |
| 4,126,117 | A | * | 11/1978 | Hastings ........................ 126/44 |
| 5,644,975 | A | * | 7/1997 | Bedford et al. ............ 126/391.1 |
| 2007/0243978 | A1 | * | 10/2007 | Allen, Jr. ...................... 482/108 |

OTHER PUBLICATIONS

Market Forge Industries, Inc., Universal Plus Electric Skillet, Owner's Manual, Form No. S-6004 Rev. D 06/08 (21 pages total).
The Airtronic Oil Burner, www.babingtontechnology.com/Airtronicburner.htm , 1 page.
How Does the Airtronic Oil Burner Work, www.babingtontechnology.com/how_does_the_babington_burner_work.htm, 2 pages.

* cited by examiner

*Primary Examiner* — Avinash Savani
*Assistant Examiner* — Benjamin W Johnson
(74) *Attorney, Agent, or Firm* — Roger C. Phillips

(57) ABSTRACT

A liquid-fuel fired tilting skillet system including a tilting skillet having a support frame and a tilting skillet pan, a liquid-fuel fired burner having a flame tube, a burner bracket on the frame for mounting the liquid-fuel fired burner, a firebox mounted beneath the pan with a burner insertion hole for receiving the burner flame tube, and a diffuser plate mounted to the bottom of the pan in the firebox targeted by the flame tube for distributing the heat across the pan bottom.

7 Claims, 7 Drawing Sheets

US 8,967,134 B1

LIQUID FUEL FIRED TILTING SKILLET SYSTEM

CROSS REFERENCE TO RELATED APPLICATIONS

This application claims benefit of U.S. Provisional Application Ser. No. 61/387,103, filed 28 Sep. 2010, entitled "JP8 Fired Tilting Skillet", the entire contents of which is incorporated herein by reference.

U.S. GOVERNMENT FUNDING

This invention was made under funding provided by the U.S. Government and thus this invention may be used for any U.S. Government purposes.

FIELD OF THE INVENTION

This invention relates to a liquid fuel fired tilting skillet system.

BACKGROUND OF THE INVENTION

Providing good food that is well prepared for the troops at the front lines is a difficult but important task as it impacts their morale as well as their health and well being. Generally cooking equipment that can boil, braise and grill is large, heavy, expensive and difficult to transport. One piece of existing equipment that is appealing is a tilting skillet which can perform these functions but it is designed to be installed in conventional kitchens and heated by natural gas burners or electric heating elements. The skillet pans of these tilting skillets may be positioned horizontally, vertically, or anywhere in between using a crank and four bar linkage mechanism. One example of such a tilting skillet is the Universal Plus Gas Tilting Skillet, Spec. No. S-4347 made by Market Forge Industries, Inc. of Everett, Mass. In the field at the front lines there are no such kitchens which run on natural gas and available fuel is usually limited to liquid fuels e.g. JP8 and diesel. In the field electric power is not portable in the quantities required for cooking equipment (approximately 15 kW per appliance).

SUMMARY OF THE INVENTION

It is therefore an object of this invention to provide a liquid-fuel fired tilting skillet.

It is a further object of this invention to provide such a liquid-fuel fired tilting skillet which heats the skillet pan uniformly and effectively.

It is a further object of this invention to provide such a liquid-fuel fired tilting skillet which uses fewer BTUs than conventionally fueled tilting skillets.

It is a further object of this invention to provide such a liquid-fuel fired tilting skillet which the liquid fired fuel burner is thermostatically controlled to regulate the temperature of the skillet/pan.

It is a further object of this invention to provide such a liquid-fuel fired tilting skillet which uses liquid-fuels available at forward positions, e.g. diesel, JP8.

The invention results from the realization that a liquid-fuel fired tilting skillet system useable at forward troop positions using available e.g. diesel or JP8 fuel, can be achieved with a tilting skillet having a support frame, a tilting skillet pan, a pan cover a liquid-fuel fired burner having a flame tube, a burner bracket on the frame for mounting the burner, a firebox mounted beneath the skillet pan with a burner insertion hole for receiving the flame tube; and a diffuser plate mounted to the bottom of the pan in the firebox targeted by the flame tube for distributing the heat across the skillet pan bottom.

The subject invention, however, in other embodiments, need not achieve all these objectives and the claims hereof should not be limited to structures or methods capable of achieving these objectives.

This invention features a liquid-fuel fired tilting skillet system including a tilting skillet having a support frame and a tilting skillet pan, a liquid-fuel fired burner having a flame tube, a burner bracket on the frame for mounting the liquid-fuel fired burner, a firebox mounted beneath the pan with a burner insertion hole for receiving the burner flame tube and a diffuser plate mounted to the bottom of the pan in the firebox targeted by the flame tube for distributing the heat across the pan bottom.

In a preferred embodiment the firebox includes a shroud extending from the burner insertion hole for shielding at least a portion of the flame tube. The liquid-fuelfired tilting skillet system may further include a thermostat for controlling the burner to regulate the temperature of the pan. The diffuser may include wings tightly engaged with the bottom of the pan for facilitating heat transfer to the pan. The diffuser may include a target surface supported by the wings spaced from the bottom of the pan. The diffuser may contain holes to increase access of the flame from the flame tube to the area of the bottom of the pan covered by the diffuser. The burner bracket may include a pair of parallel rods for receiving a pair of brackets on the burner and a pair of mounting pins for fixing the burner in position on the rods. The firebox may be insulated on at least one of the inside and outside surfaces.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
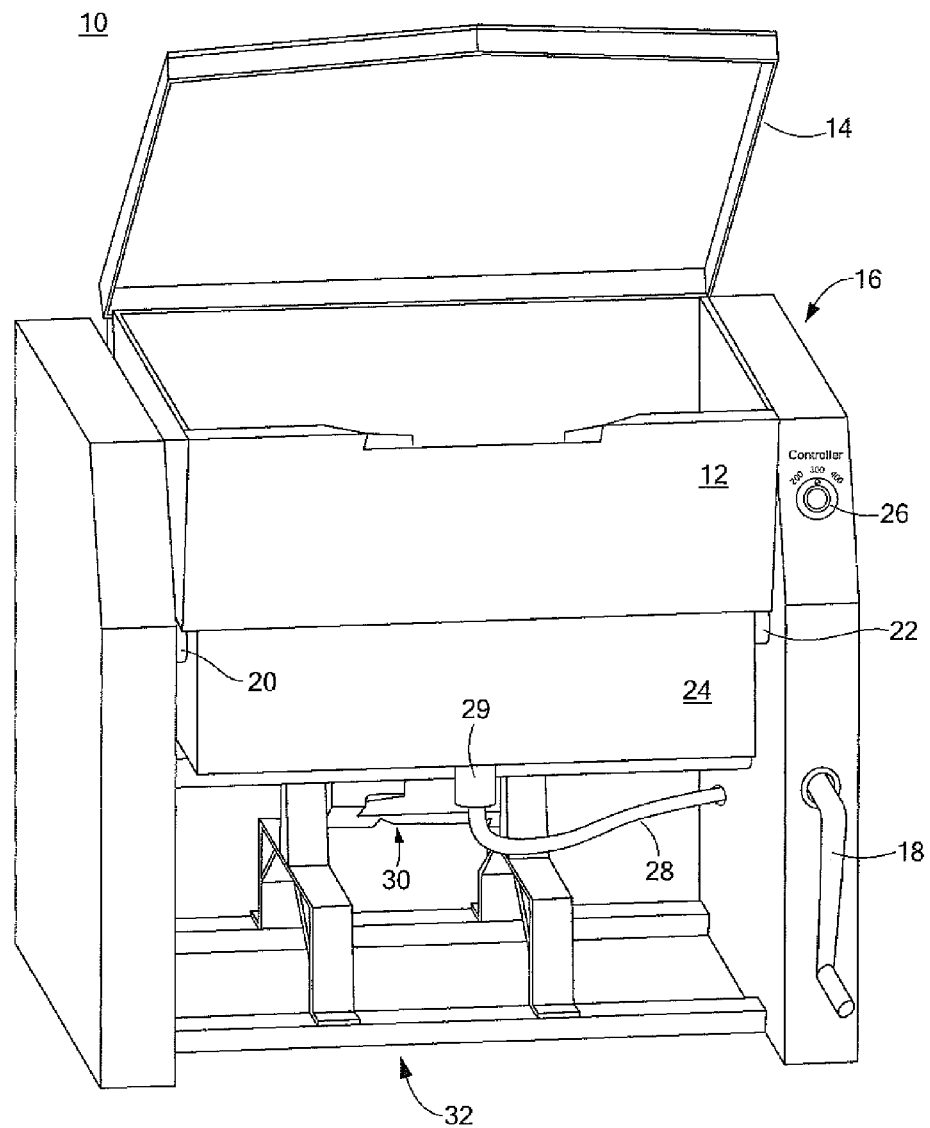
FIG. 1 is a front, three dimensional view of a tilting skillet system according to this invention with the skillet pan tilted slightly up in the back and the cover open.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

In order to reduce costs and provide equipment which is familiar and comfortable for the users, this specific embodiment of the invention discloses a liquid-fuel fired tilting skillet system according to this invention which uses a commercial tilting skillet, the Universal Plus Gas Tilting Skillet, Spec. No. S-4347 made by Market Forge Industries, Inc. of Everett, Mass. and added to in accordance with this invention.

There is shown in FIG. 1 a liquid-fuel fired tilting skillet system 10 according to this invention using a conventional tilting skillet having a skillet pan 12 and cover 14 which are mounted on frame 16. Cover 14 is open and closed and pan 12 is tilted up and down in the normal way using a conventional crank, for example 18 and four bar linkage mechanism not shown. Pan 12 with cover 14 is rotatably mounted on journals 20, 22 on frame 16. A firebox 24 is mounted on the bottom of pan 12. Frame 16 carries a control circuit the temperature control knob 26 of which is mounted on the front of frame 16. A cable 28 containing wire connections between a thermostat and limit switch in firebox 24 and the control circuit (not shown in FIG. 1) housed in frame 16 behind knob 26 extends from frame 16 through collar 29. Also partially shown in FIG. 1 is a liquid-fuel fired burner 30 mounted on a bracket 32. In this embodiment the liquid-fuel fired burner 30 is implemented with a Babington Airtronic Burner available from Babington Enterprises Inc. but the invention is not limited to any particular fuel fired burner.

Figure 2:
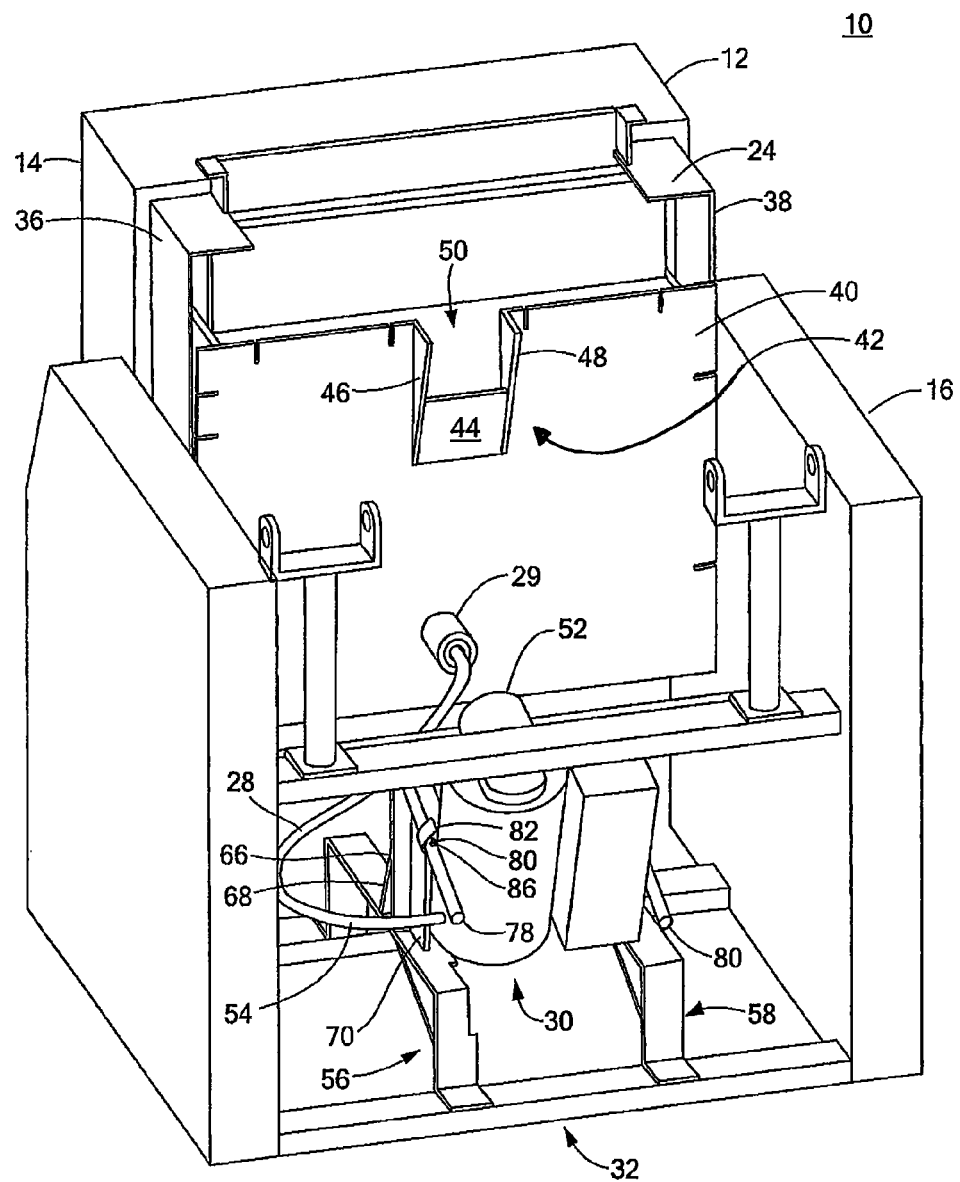
FIG. 2 is a back, three dimensional view of a tilting skillet system according to this invention with the skillet pan tilted to nearly the vertical position showing the liquid-fuel fired burner and burner bracket according to this invention.

Firebox 24 is shown in more detail in FIG. 2 where the tilting skillet pan 12 has been rotated forward to approximately the vertical position, and the cover 14 has been removed. Firebox 24 includes sidewalls 36 and 38 and a front wall not shown in FIG. 2. Firebox 24 also includes a bottom plate 40 with shroud 42 which includes inclined wall 44 and two wedge shaped sidewalls 46 and 48. Also shown is the burner insertion hole 50 which accommodates the flame tube 52 of burner 30. Also shown in FIG. 2 is the cable connection 54 between burner 30 and the control circuit mounted in frame 16. Bracket 32 includes two stands 56 and 58 shown more clearly in FIG. 3.

Figure 3:
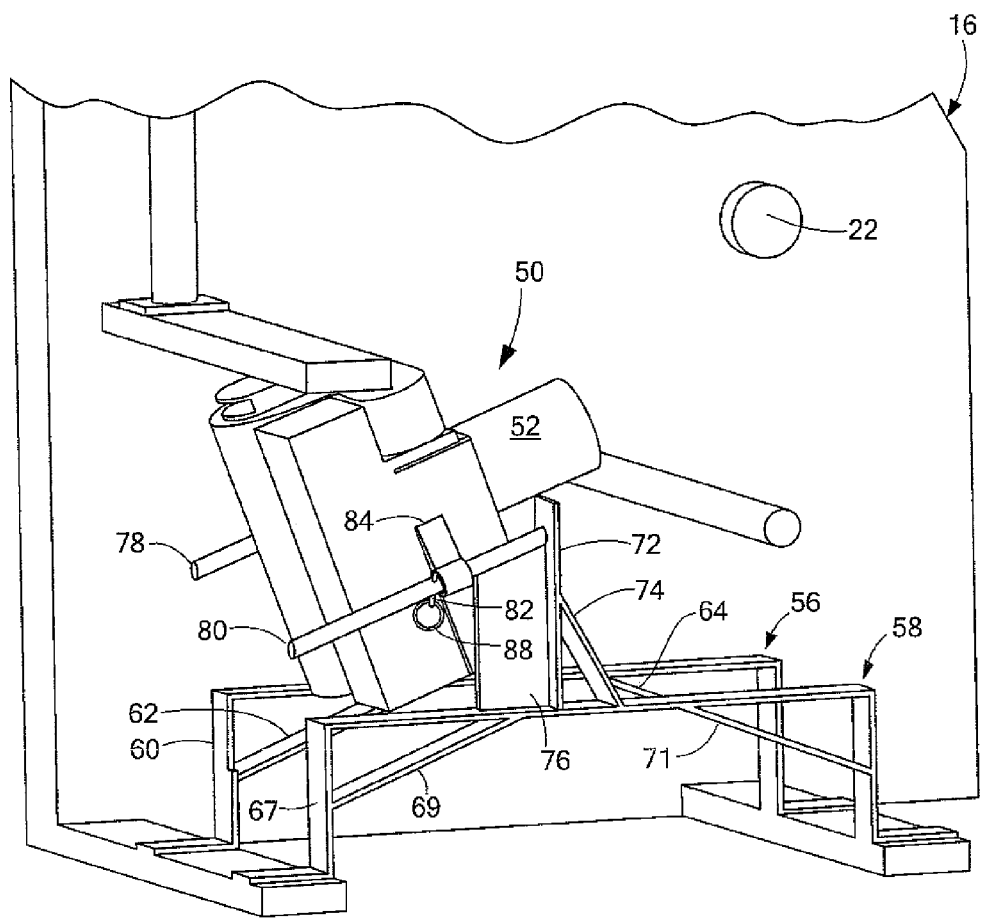
FIG. 3 is a right side, three dimensional view of the tilting skillet of FIG. 2 with parts broken away.

Referring to FIGS. 2 and 3, stand 56 includes a "U" shaped strap 60 with angle supports 62 and 64 and carries on top an upright strut 66 reinforced by support 68 and fillet plate 70. Likewise stand 58 includes "U" bracket 67 and angle supports 69 and 71 which support vertical strut 72 having an angle support 74 and a fillet plate 76. Carried by stands 56 and 58 extending from vertical struts 66 and 72 are inclined rods 78 and 80 which receive mounting brackets 82 and 84 of burner 30. Cotter pins 86 and 88 received in holes 90 and 92 in rods 78 and 80 facilitate easy removal and replacement of burner 30 in the field and insure its proper positioning when installed.

Figure 4:
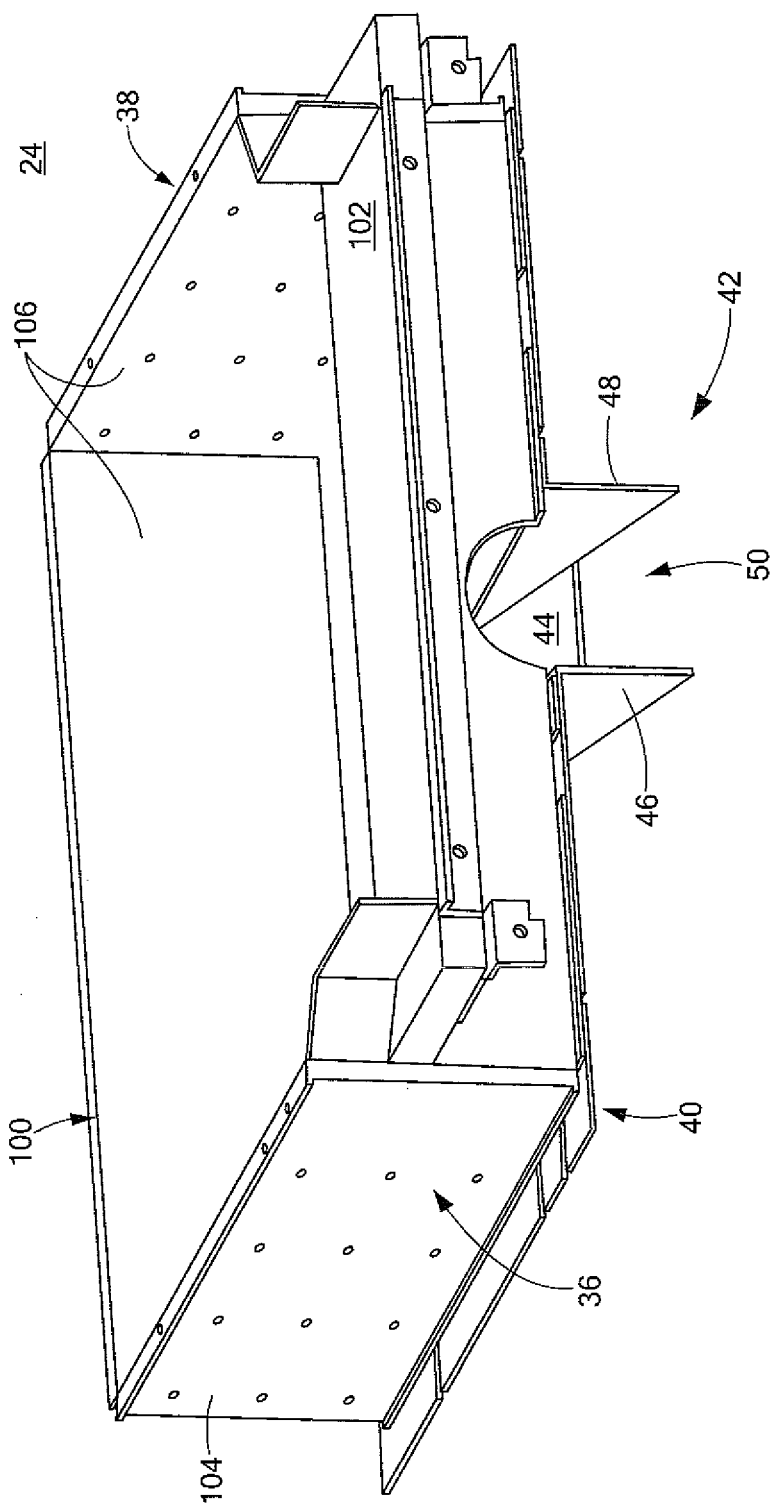
FIG. 4 is a rear, three dimensional view of the firebox of FIGS. 1 and 2 showing the shroud and flame tube hole.

Firebox 24 is shown in more detail in FIG. 4 with front wall 100 and an exhaust port 102. Note that either or both the inside and the outside of all three walls, 36, 38 100 and bottom plate 40 can be insulated. Insulation on the outer walls as shown representatively at 104 may be a fiberglass or ceramic material having an outer Teflon layer for easy cleaning such as a 1" thick, 8 pcf density Kaowool blanket with stainless steel mesh on the hot face available from Anchor Insulation of Wilmington Mass. Insulation on the inner walls and inside of base 40 as representatively shown at 106 may use a ceramic insulation with a wire mesh retainer such as flexible Kaowool blankets available from Inswool or Durablanket. The liquid-fuel fired tilting skillet system of this invention is efficient as well. It provides comparable cooking performance at 56,000 BTU's per hour when compared to a conventional natural gas fired tilting skillet which provides 93,000 BTU's per hour.

Figure 5:
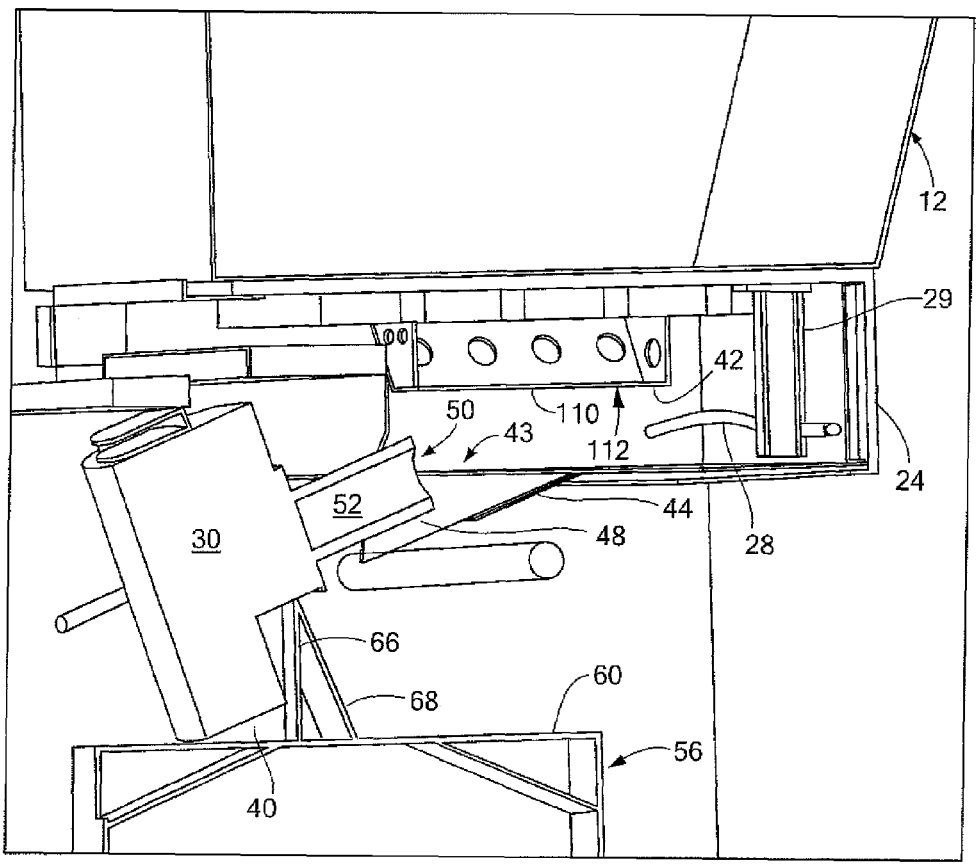
FIG. 5 is a side sectional view with parts broken away showing the arrangement of the burner and flame tube, shroud, flame tube hole and diffuser in the firebox.

The relative positions of burner 30, flame tube 52, shroud 42 and firebox 24 are demonstrated in FIG. 5 which is a sectional view with portions broken away. There the accommodation of flame tube 52 in burner insertion hole 50 can readily be seen with flame tube 52 surrounded by shroud 42 including inclined plate 44. The flame tube 52 is targeted at approximately the center 110 of diffuser 112. Diffuser 112 functions in accordance with this invention to prevent the burner flame from flame tube 52 from creating a hot spot on the incident portion of pan 12 by transferring the heat and diffusing it across the bottom of the pan. Diffuser 112 is shown in greater detail in FIG. 6 where diffuser 112 is shown to have sidewalls or wings 114 and 116 with mounting flanges 118 and 120 which can be securely fastened to the bottom 122 of pan 12 to ensure good heat transfer to the bottom 122. The target portion 110 of top plate 124 of diffuser 112 includes a plurality of holes 126 to allow some of the flame/heat to reach the bottom 122 of skillet pan 12 directly to maximize heat transfer efficiency. Additional holes 128, 130, 132 and 134 may be provided in side walls 114 and 116. Relief holes 136, 138 may also be provided to accommodate conventional heat transfer vanes 140.

Figure 6:
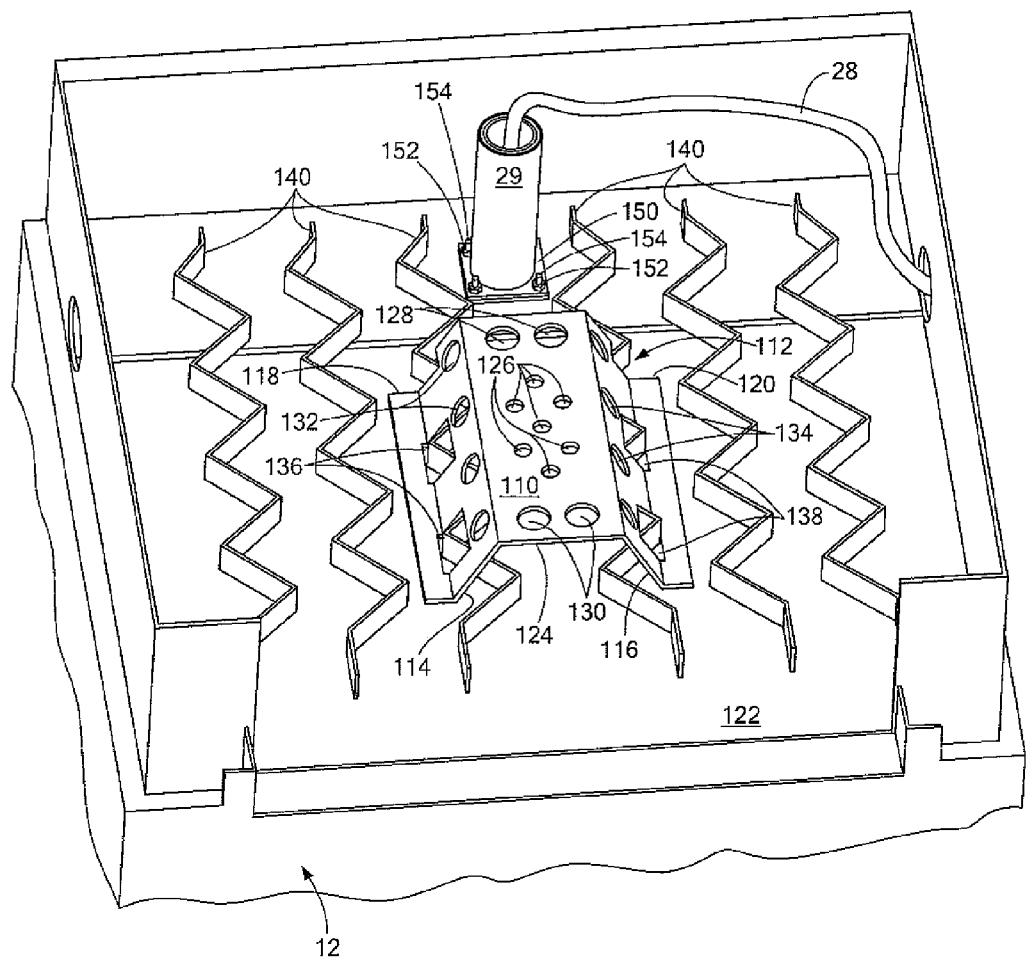
FIG. 6 is a three dimensional view of the diffuser and heat transfer vanes on the bottom of the skillet pan.
Figure 7:
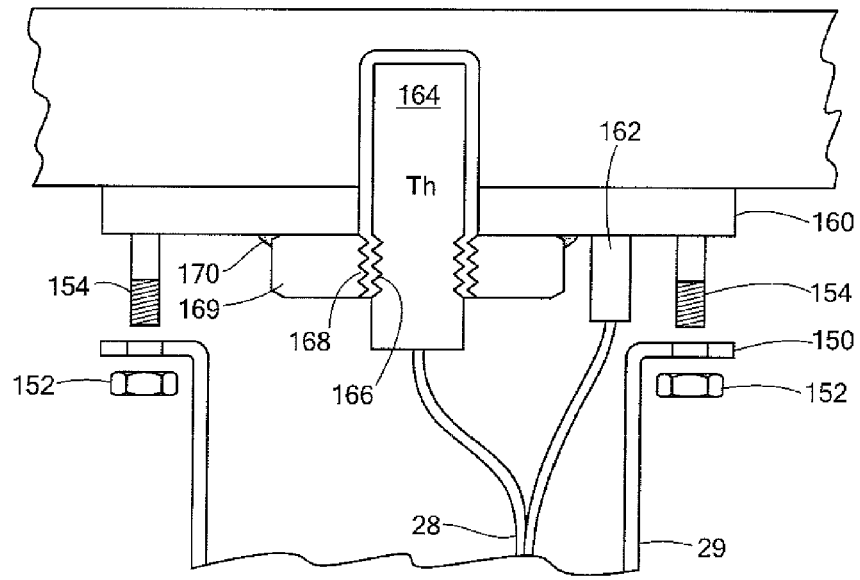
FIG. 7 is a side sectional diagrammatic view of the thermostat and limit switch.
Figure 8:
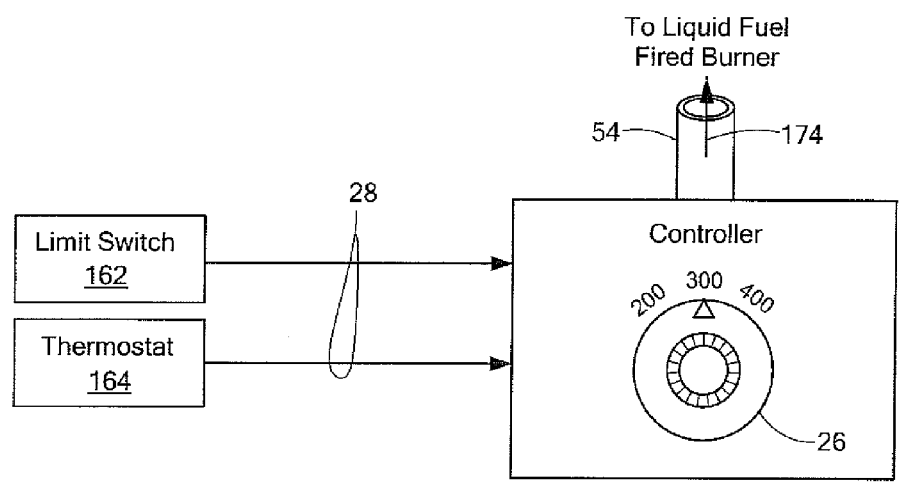
FIG. 8 is a schematic diagram of the control circuit for the burner.

Also in FIG. 6 is shown collar 29 that receives cable 28 and includes flange 150 which is mounted on studs 154 through a mounting plate 160, FIG. 7, and secured with nuts 152. Mounting plate 160 has mounted on it a high-limit switch 162 which cuts off burner 30 if the temperature reaches some maximum predetermined limit e.g. 550° F. Mounting plate 160 also carries thermostat 164 with threads 166 that engage threads 168 on nut 169 welded at 170 to plate 160. Limit switch 162, FIG. 8, and thermostat 164 provide inputs to a conventional tilting skillet thermal control circuit using control knob 26 and controls the burner 30 on line 174.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A liquid fired fuel tilting skillet system comprising:
  a tilting skillet having a support frame and a tilting skillet pan;
  a liquid fuel fired burner having a flame tube;

a burner bracket on said frame for mounting said liquid fuel fired burner;

a firebox having a bottom plate and being mounted beneath said pan with a burner insertion hole defined by a shroud having an inclined plane and two wedge shaped sidewalls wherein the inclined plane extends at an acute angle to a first plane defined by the bottom plate for receiving said burner flame tube;

a diffuser plate defining a second plane that extends generally parallel to the first plane and being mounted to the bottom of said pan in said firebox, said diffuser plate being targeted by said burner insertion hole for distributing heat across said pan bottom, said diffuser plate having a planar target surface plate including holes and wings extending from opposing sides of the target surface plate, the wings including a plurality of relief holes; and a plurality of zig zag shaped vanes mounted to the bottom of said pan, two of which vanes being located and configured to extend through a respective relief hole.

2. The liquid fired fuel tilting skillet system of claim 1 in which said shroud shields at least a portion of said flame tube.

3. The liquid fired fuel tilting skillet system of claim 1 further including a thermostat for controlling said burner to regulate the temperature of said pan.

4. The liquid fired fuel tilting skillet system of claim 1 in which said wings tightly engaged with the bottom of said pan for facilitating heat transfer to said pan.

5. The liquid fired fuel tilting skillet system of claim 1 in which said holes of the planar target plate are configured to increase access of the flame from the flame tube to the area of the bottom of said pan covered by said diffuser.

6. The liquid fired fuel tilting skillet system of claim 1 in which said burner bracket includes a pair of parallel rods for slideably receiving a pair of brackets on said burner and a pair of mounting pins for fixing said burner in position on said rods.

7. The liquid fired fuel tilting skillet system of claim 1 in which said firebox is insulated on at least one of the inside and outside surfaces.

* * * * *